Dec. 25, 1934.                R. B. WATSON                1,985,435
                    WATER PURIFICATION AND SUPPLY SYSTEM
                            Filed Feb. 1, 1934
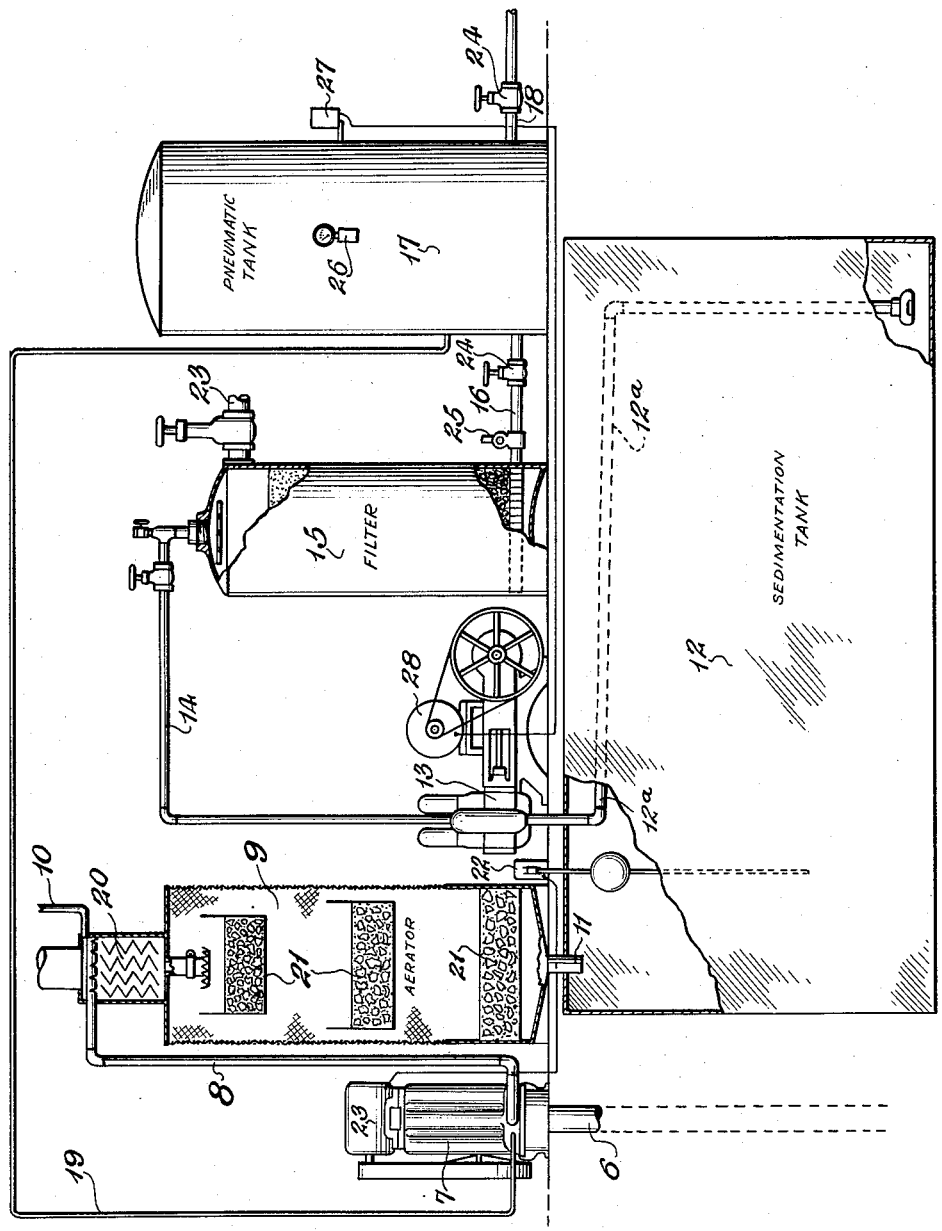
Inventor
Robert B. Watson.
By
                                                    Attorney Patented Dec. 25, 1934

1,985,435

UNITED STATES PATENT OFFICE 1,985,435

WATER PURIFICATION AND SUPPLY SYSTEM

Robert B. Watson, Whitehaven, Tenn.

Application February 1, 1934, Serial No. 709,378

6 Claims. (Cl. 210—26)

This invention relates to systems or apparatus for the purification of water and will find its main utility in domestic, school, industrial plant and other local systems as distinguished from general or city systems.

Many of these local systems, for domestic and similar use, include a pump which takes water from a well and discharges it into a pneumatic or pressure tank, from which service is taken off as desired, by means of the air pressure in the tank. The use of purification methods or apparatus, between the well and the pressure tank, is difficult and practically prohibited in such apparatus, because intermediate aerators, sedimentation tanks or the like would interfere with the pressure requirements in the tank and require time for operation. For example sedimentation requires several hours, which if normally interposed between pump and pressure tank would destroy the automatic operation of the latter. Attempts have been made to put filters between pump and tank, but they are not successful, as they will not take out salts in solution, and when water containing salts in solution is exposed to air in the tank the salts oxidize and "rusty" water is delivered, or the filter will clog and "channel". The problem therefore has been to purify the water and at the same time maintain the "automatic" features of such an apparatus.

The main object of the present invention is to provide means between the well pump and the pressure tank for purifying the water delivered to the latter, the purification being especially directed to the removal of iron salts in the water, together with the removal of gases and objectionable odors, and including also aeration, sedimentation and filtration, for making the water clear and palatable and removing foreign and solid matters of all kinds, without, however interfering with the service supply from the pressure tank. This permits purification of water in such local systems to the full extent to which it has been possible in municipal and other large systems.

One form of the invention is illustrated in the accompanying drawing, which is mainly a diagram of the apparatus.

Referring to the drawing, 6 indicates the well or cistern from which the water is drawn by a pump 7 and delivered by a pipe 8 to the top of an aerator or aerating column 9, through which it may flow by gravity. This pump is of the known air and water delivery type, delivering both. The aerator may be of any suitable construction, such as one provided with baffles 20 and spray pans 21 to subject the water passing therethrough to the action of air therein. It may be provided with a gas escape outlet 10 for the escape of gases or odors especially carbonic dioxide and hydrogen sulphide. The bottom of the aerator has an outlet 11 to a sedimentation tank 12 of rather large capacity where the water will be stilled and solid matter can settle which requires from 4 to 8 hours in ordinary installations.

The tank is provided with a float switch 22 which controls the circuit of the pump motor 23 to start and stop the same according to the height of water in the tank.

Raw water as it comes from the well often contains iron salts in solution, usually in the form of ferrous oxide or ferrous bicarbonate. Aeration oxidizes such salts to insoluble ferric oxide which collects in the sedimentation tank, the released carbon dioxide venting to atmosphere from the aerator. The water in the sedimentation tank, with the ferric oxide in suspension, is preferably drawn from near the bottom thereof and the insoluble ferric oxide is easily removed as solid matter by the filter and can be "back-washed" out in a known manner, so that the water which finally reaches the tank is pure and free from objectionable gases and solidified matter.

From the sedimentation tank water is lifted through a pipe 12a from a low point in the tank by a pump 13 and delivered through a pipe 14 to the top of a filter 15. This filter may be of any type suitable for the purpose, embodying porous materials or any other of the stock filters for the purpose. From the filter the purified water passes through a pipe 16 to the pneumatic or pressure tank 17 from which it may be drawn off by pipe 18 to service as desired.

A back wash outlet is indicated at 23, and the connections are provided with suitable control valves as at 24 and relief valve 25. A known "air volume" control valve on the pressure tank is indicated at 26, and an automatic switch on the tank is indicated at 27 controlling the circuit to the motor 28 of the pump 13, as usual, to control the water supply to and pressure in the tank.

Obviously the aerator, sediment tank and filter are not subjected to the pressure created by the pump 7. However, it is necessary to maintain the water in the pressure tank 17 under the desired head or air pressure necessary for service, otherwise absorption of air by the water would fill the tank with water and stop the operation.

For this purpose a by-pass air line 19 extends from the air delivery outlet of the pump 7 to the pressure tank 17, whereby the water in the tank is maintained under pressure, the air necessary being supplied by the pump 7, the volume of air in the tank being controlled by the valve 26 which lets off excess air, and the pressure serves to discharge the water therefrom to service, the water itself in the intervening stages being free to flow by gravity through the aerator and collect in the sedimentation tank and then pumped by the pump 13 through the filter. The result will be that the water will be purified by aeration, sedimentation, and filtration, in connection with the local pump and pressure tank hitherto used in such systems.

To backwash the filter, the valve in the outlet 23 is opened permitting clear water from tank 17 to flow upward through the filter and wash out the precipitates through the outlet 23.

The pressure tank may be omitted and a gravity or elevated tank substituted in which case the water will be elevated to the gravity tank by pump 13, through the filter, and the said pump will be controlled by a float switch in the gravity tank. This, also, permits the use of clear water for backwashing the filter.

I claim:

1. In a liquid purification apparatus, the combination with a pump and an air pressure tank, of an aerator connected to the pump, a sedimentation tank into which the aerator discharges, a filter having an inlet from the sedimentation tank and an outlet to the pressure tank, and a by-pass air line connecting the pump and the pressure tank.

2. In a liquid purification apparatus, the combination of a well pump delivering both air and water, an aerator into which the pump discharges water, a sedimentation tank into which the aerator delivers, a second pump drawing water from said tank, a filter to which the second pump delivers, a pressure tank connected to the filter, and an air supply line from the well pump to the pressure tank, said line by-passing the aerator, sedimentation tank and filter.

3. The combination stated in claim 2, said pumps being motor operated, and a float switch in the sedimentation tank controlling the motor of the well pump, and an automatic switch on the pressure tank controlling the motor of the second pump.

4. In a liquid purification and supply apparatus, the combination with a first pump, liquid purifying devices to which the pump delivers, including a sedimentation tank of relatively large capacity and under atmospheric pressure, a second pump drawing water from the said tank, a filter and an automatic air pressure tank into which water is delivered by the second pump, means controlled by the water in the tank to govern the operation of the first pump, and means controlled by the delivery of water from the pressure tank to govern the operation of the second pump.

5. In a liquid purification and supply system, the combination with a well pump delivering both air and water, and an automatic pressure tank, of a water line containing water purification apparatus, a second pump between said apparatus and the tank, and a separate air line between the well pump and the tank.

6. The combination stated in claim 5, and means controlled by the amount of water drawn from the purification apparatus to govern the operation of the well pump and the supply of water and air through the lines respectively.

ROBERT B. WATSON.